(12) United States Patent
Limpkin et al.

(10) Patent No.: US 7,646,279 B2
(45) Date of Patent: Jan. 12, 2010

(54) APPARATUS FOR SUPPLYING ENERGY TO A LOAD AND A RELATED SYSTEM

(76) Inventors: George A. Limpkin, 22 Hayes Mead, Ciltern Park, Berkhamstead (GB) HP14 1BU; Simon G. Rozenberg, The Bothy House, Mentmore (GB) LU7 0QG (*) Notice: Subject to any disclaimer, the term of this patent is extended or adjusted under 35 U.S.C. 154(b) by 821 days.

(21) Appl. No.: 10/553,991

(22) PCT Filed: May 4, 2004

(86) PCT No.: PCT/GB2004/001897

§ 371 (c)(1),
(2), (4) Date: Oct. 19, 2005

(87) PCT Pub. No.: WO2004/097866

PCT Pub. Date: Nov. 11, 2004

(65) Prior Publication Data

US 2007/0076459 A1    Apr. 5, 2007

(30) Foreign Application Priority Data

May 2, 2003    (GB) ................................. 0310088.0

(51) Int. Cl.
*H01F 21/06* (2006.01)
(52) U.S. Cl. .................. 336/131; 336/138; 336/145; 315/209 R; 315/291; 315/276; 363/98
(58) Field of Classification Search .................. 336/30, 336/134, 136, 130, 131, 138, 145; 361/93.1, 361/100, 115; 363/16, 17, 89, 98, 127; 315/209 R, 315/276, 244, 291
See application file for complete search history.

(56) References Cited

U.S. PATENT DOCUMENTS 4,149,133 A * 4/1979 Hilgert ........................ 336/30

(Continued)

FOREIGN PATENT DOCUMENTS

DE    4344071 A    7/1995

(Continued)

OTHER PUBLICATIONS

David R. Lide, CRC Handbook of Chemistry and Physics, 79th Edition, 1998, CRC Press, Boca Raton, p. 12121.

*Primary Examiner*—Haissa Philogene
(74) *Attorney, Agent, or Firm*—David A. Guerra

(57) ABSTRACT

Apparatus for supplying energy to a load, comprises a power supply unit (102) e.g. a switched mode electronic transformer or electronic ballast having an input for receiving current at mains frequency and a means for stepping-up said mains frequency to a higher frequency e.g. 30-50 kHz and an output for delivering energy at the higher frequency. A two part connector (108) has a first core portion (106) that has a primary winding (104) connected to the output of the power supply unit and a mating second core portion (112) that has a secondary winding (110) for delivery of energy to a load (114), the core portions being of a high resistivity material, e.g. a ferrite having a resistivity of at least $10^4$ $\Omega$cm. The apparatus may be used to power e.g. low voltage halogen or other incandescent lighting, fluorescent lighting, or an electric motor, a power supply for a computer, radio, television or like electronic device, a heater or the like.

41 Claims, 16 Drawing Sheets

U.S. PATENT DOCUMENTS

| | | |
|---|---|---|
| 4,303,902 A | 12/1981 | Lesster et al. |
| 4,713,740 A | 12/1987 | Drabing |
| 6,198,230 B1 * | 3/2001 | Leeb et al. ................... 315/224 |
| 6,504,732 B2 * | 1/2003 | Abe ............................. 363/17 |
| 6,631,064 B2 * | 10/2003 | Schuellein et al. ......... 361/93.1 |
| 6,667,584 B2 * | 12/2003 | Hooijer et al. .............. 315/224 |
| 7,122,939 B2 * | 10/2006 | Chou et al. ................. 310/318 |
| 2002/0008973 A1 | 1/2002 | Boys et al. |

FOREIGN PATENT DOCUMENTS

| | | |
|---|---|---|
| EP | 0982832 A | 3/2000 |
| EP | 1063468 A | 12/2000 |
| EP | 1130752 A | 9/2001 |
| GB | 1366134 A | 9/1974 |
| WO | WO-0235578 A | 5/2002 |

* cited by examiner

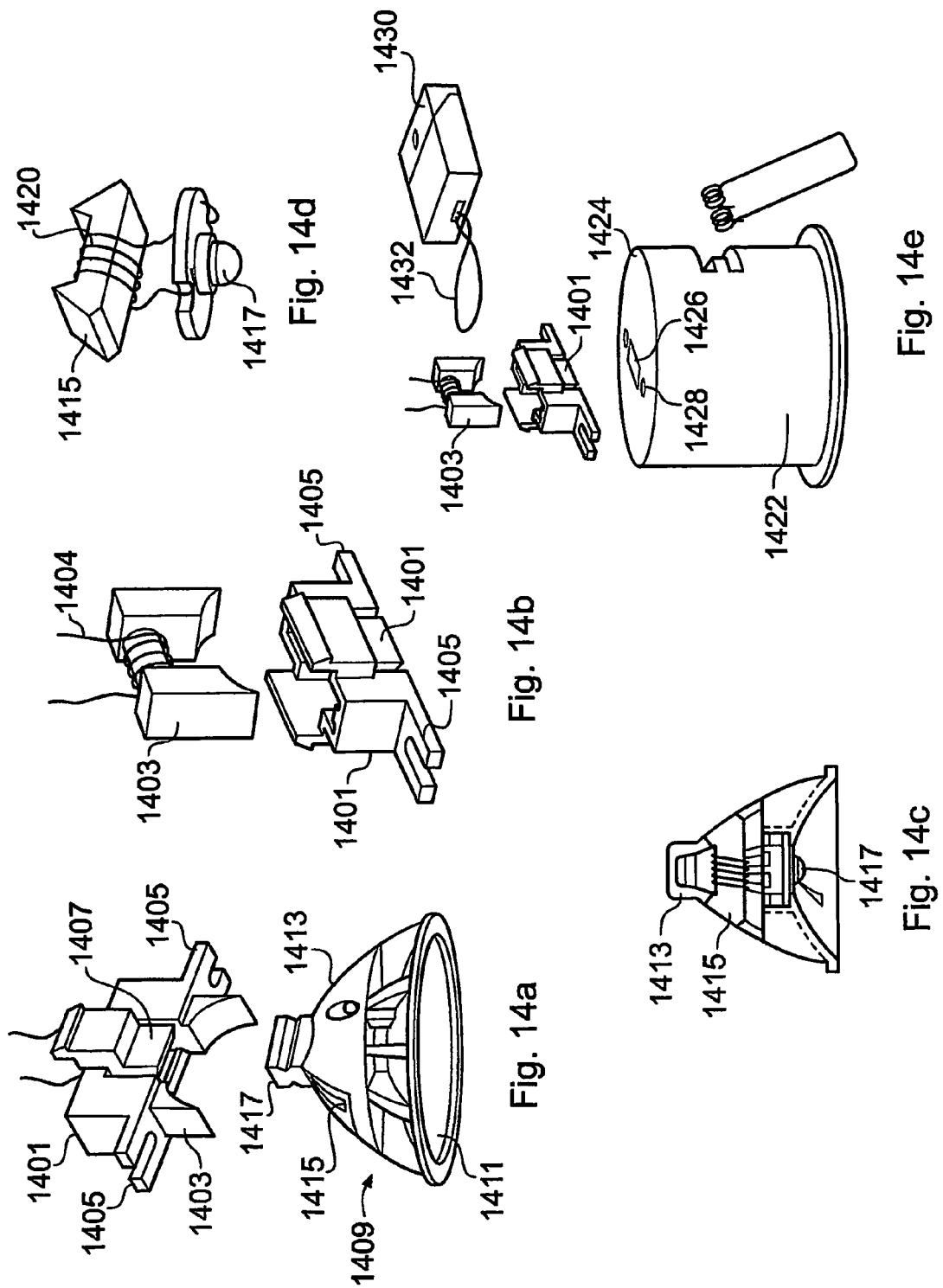

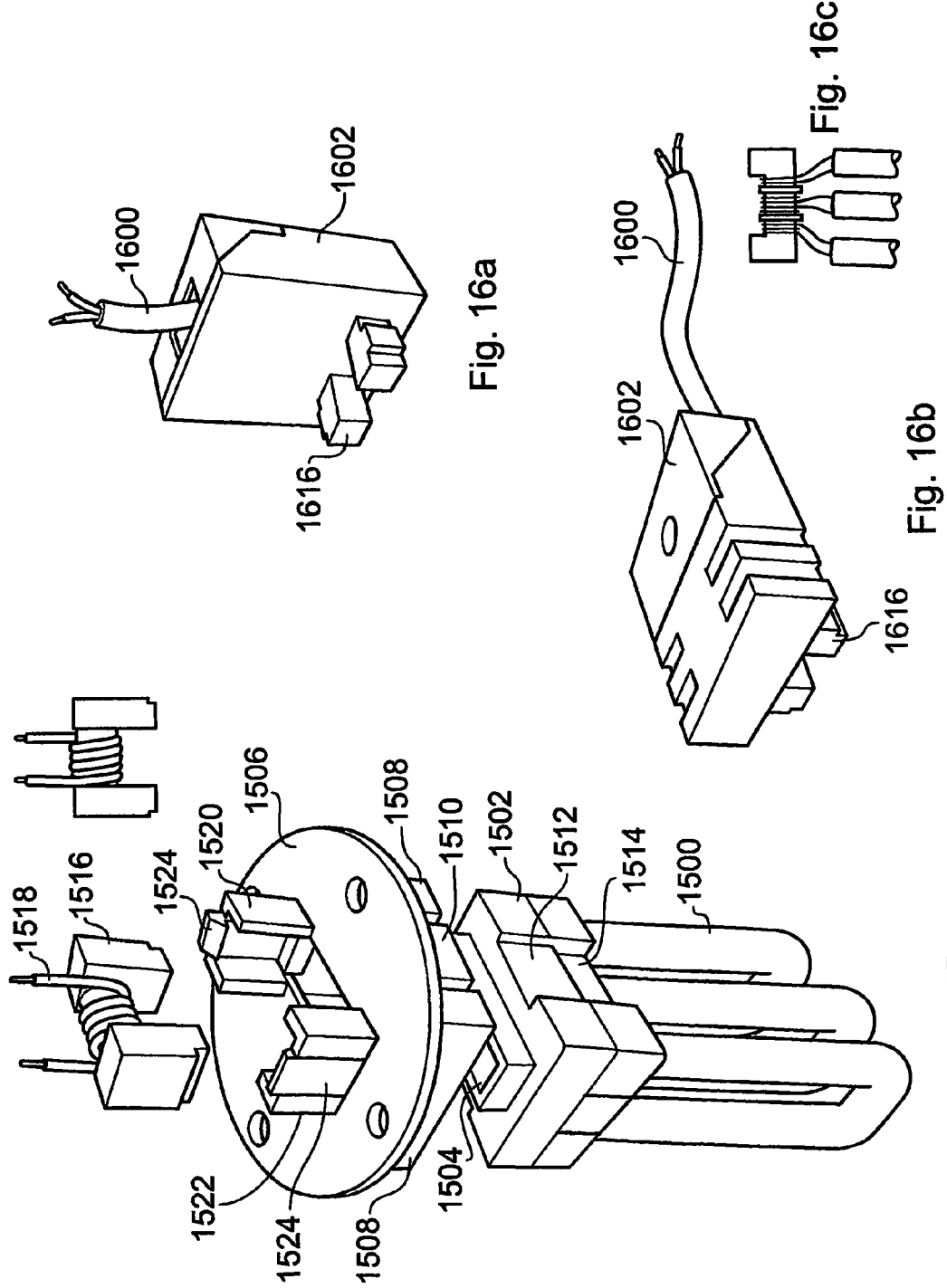

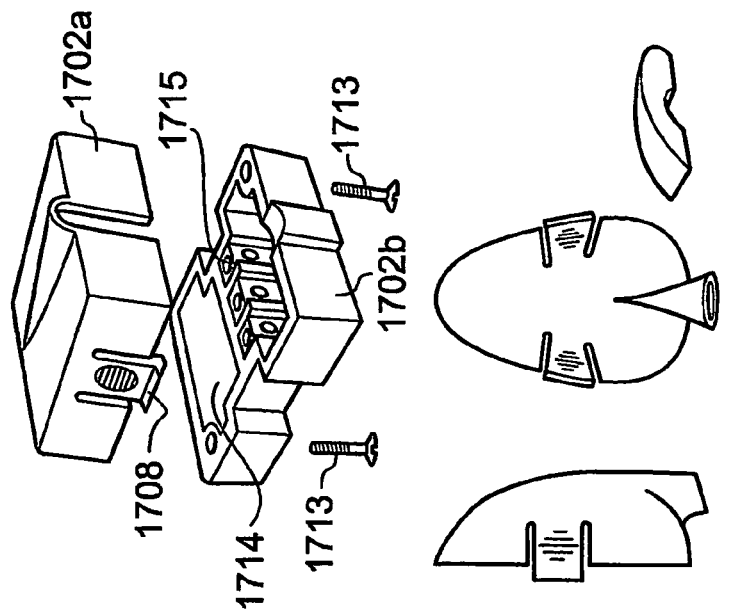
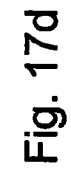
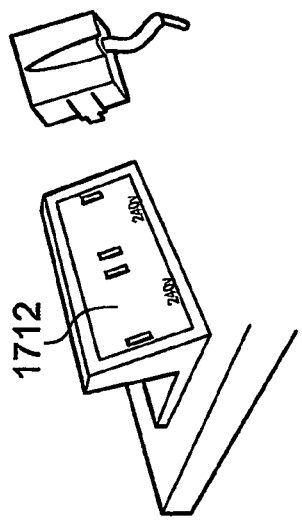
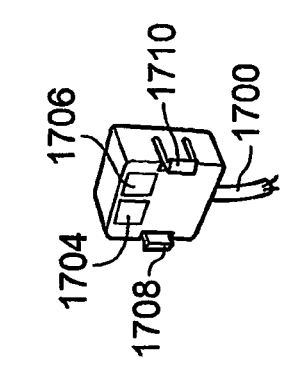
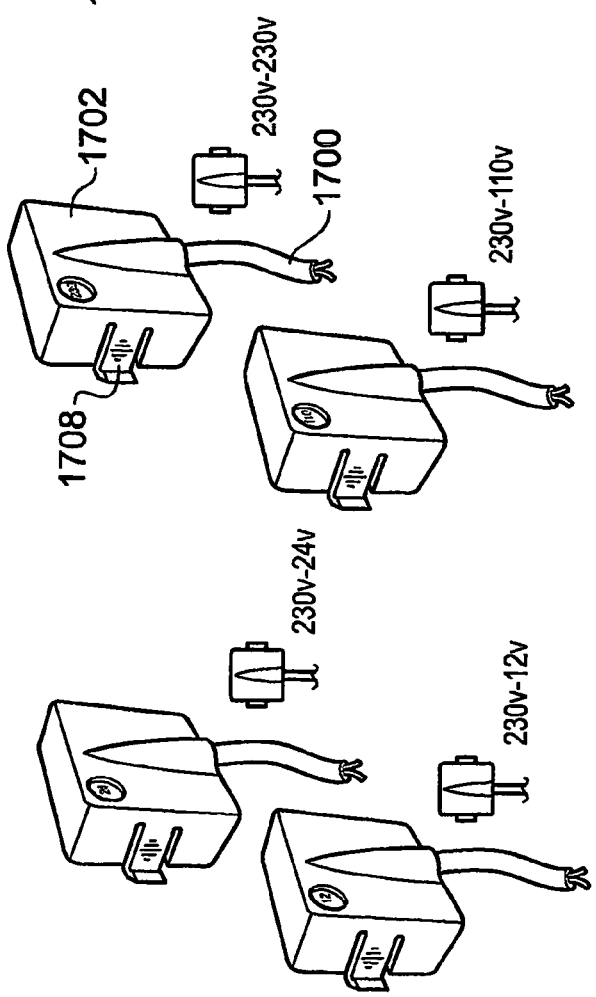

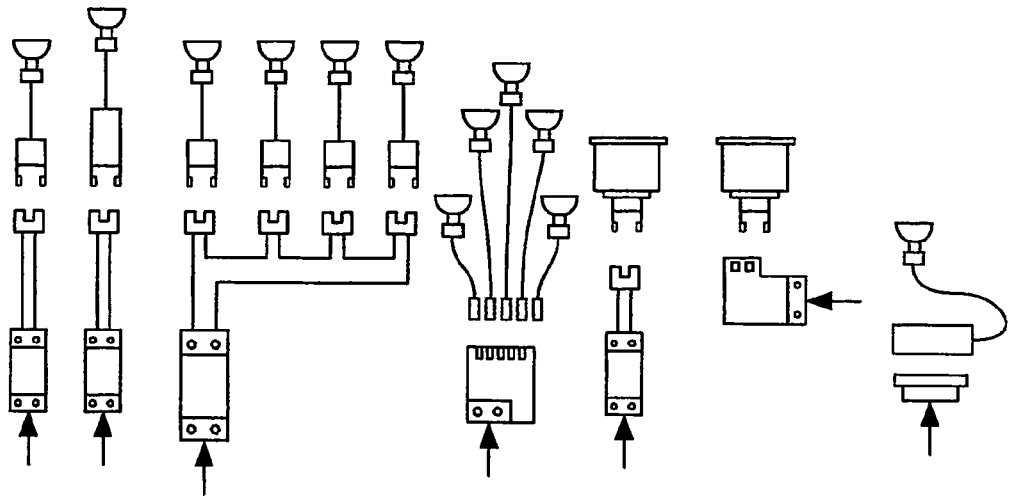
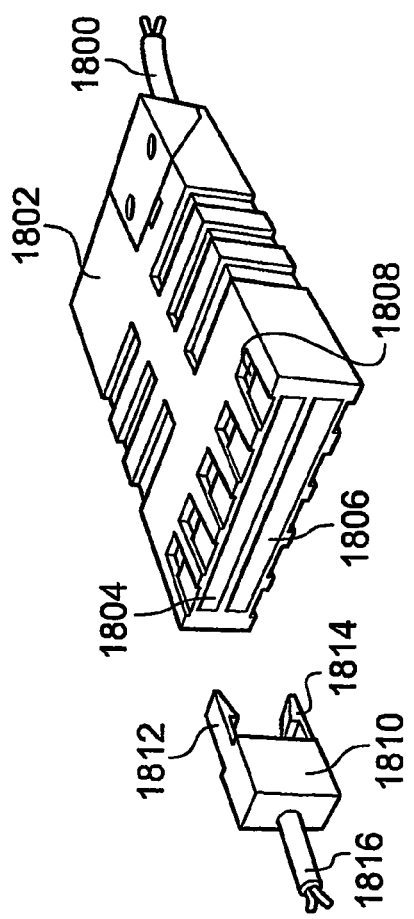
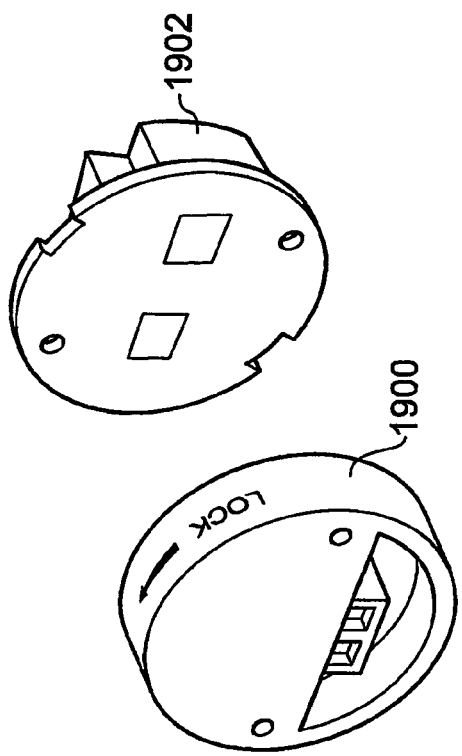
Fig. 18b
Fig. 18a
Fig. 19

APPARATUS FOR SUPPLYING ENERGY TO A LOAD AND A RELATED SYSTEM

CROSS-REFERENCE TO RELATED APPLICATIONS

This application is an U.S. national phase application under 35 U.S.C. §371 based upon co-pending International Application No. PCT/GB2004/001897 filed on May 4, 2004. Additionally, this U.S. national phase application claims the benefit of priority of co-pending International Application No. PCT/GB2004/001897 filed on May 4, 2004 and Great Britain Application No. 0310088.0 filed on May 2, 2003. The entire disclosures of the prior applications are incorporated herein by reference. The international application was published on Nov. 11, 2004 under Publication No. WO 2004/097866 A1.

FIELD OF THE INVENTION

The present invention relates to an apparatus for supplying energy to a load and a related system. More particularly the invention relates to an electrical energy transmission apparatus including a two-part induction connector as a means of delivering energy to electrical appliances for example: lighting equipment, computers, peripheral equipment such as battery re-chargers and printers, office equipment, such as photocopiers and drinks machines. The apparatus and related system may also be used in circuits in buildings such as houses, flats, offices, schools and universities, commercial buildings and the like, as well as in outdoor lanterns and garden lighting.

The invention incorporates a two-part induction connector for coupling energy from an individual primary connector to one or more secondary connector(s), there being in electrical connection with the or each secondary connector one or more electrical appliances, such as a lamp. Alternatively electrical equipment or appliances may have built-in secondary devices for direct inductive coupling to a primary connector.

The invention is particularly, though not exclusively, applicable to low voltage lighting (voltage <50V) or fluorescent lighting, although the use of loads in a power, as opposed to a lighting, circuit is also envisaged, such loads being for example an electric motor, a power supply for a radio, a television or like electronic device, a heater or the like.

PRIOR ART

Building power supplies have mainly used wiring that makes a direct metal-to-metal contact with terminals of a load. These include plug and socket connectors of various types. In the UK, wiring regulations are governed by BS 7671 "Requirements for electrical installations" and IEC Publication 364 "Electrical installation of buildings". The electrical supply is typically divided into different circuits with different current ratings from 6 amps for lighting circuits serving ceiling roses and lamp holders to 13 amps for appliances served via socket outlets (normally 3-pin plugs according to BS 1363) and up to 40 amps for a cooker or electric shower unit Electrical power sockets are supplied by established suppliers such as MK Electric who provide various electrical power plugs, sockets and connectors for worldwide applications.

More recently, low voltage lighting has come into use, e.g. for recessed down lights based on Tungsten Halogen lamps operating at 12V via a transformer, and similar surface-mounted spotlights and track or wire-based lighting systems. Such lighting still requires direct electrical contact with terminals of the load to a power source.

GB-A-0392052 (Siemens) discloses a two-part inductive magnetic connector for use in a location having an atmosphere contaminated with firedamp or other explosive gas. Transmission from a mains supply to a load is effected inductively using a casing having mains and load portions each enclosing a respective half of a ring magnetic core wound with a primary (mains) or secondary (load) winding. How the portions of the casing fit together is not explained in detail, but it is apparent from the drawing that the inner surface of the load portion is formed with a recess, that is a push fit onto an external recess of the mains portion. When the load is removed, a keeper fits across the limbs of the mains half-core to avoid excessive current flowing through the primary winding that could otherwise overheat and burn out. GB-A-1366134 is concerned with lighting fittings in hazardous atmospheres and discloses a similar two-part connector in which the primary winding is connected in an L-C circuit that when under load is tuned to the frequency of a supply (e.g. 1 kHz) but which becomes de-tuned on separation of the parts. In one embodiment the core parts meet face-to-face and in another embodiment the load part fits coaxially into the core part. U.S. Pat. No. 3,995,209 is similar and is concerned with connectors for use in communications systems. U.S. Pat. No. 4,303,902 is also generally similar but discloses the use of ferrite cores and transmission frequencies of e.g. 100 kHz but does not disclose transmission of energy for load devices as opposed to electrical signals e.g. for communications purposes at such frequencies and is devoid of detail as to energy supply. The inductive couplers that it describes are intended for use where the ambient medium dictates against normal exposed metal-to-metal contact, e.g. for avoiding sparks in explosive atmospheres, for use in the off-shore industry, or for underwater applications, see also GB-A-2020116 which concerns a coupler for underwater use and U.S. Pat. No. 4,538,863 which discloses couplers for underwater electrical supply or power lines.

SUMMARY OF THE INVENTION

The invention is based on the realization that with modern electronic high frequency energy supplies it has become feasible to use a two-part induction coupling to provide energy transmission to a load, provided that the core material of the coupling device is resistive to avoid eddy currents and low hysteresis and is low loss to avoid overheating at the frequencies used, and that over-current problems under no-load conditions are not so severe at the higher frequencies used where the primary winding on the first half-core provides a reactance, and where the energy supply has built-in over-current and/or load short circuit protection. In particular, the combination of a high frequency energy supply with a two-part coupling having a core of a low reluctance material is believed to be new. Frequencies which are envisaged are above 23 kHz extending to a frequency of typically 10 MHz. Preferably the range currently envisaged is between 25-100 kHz, more preferably between 25-60 kHz. Use of so-called quasi-mode power supplies permits high efficiency frequency conversion from a relatively low to a high frequency.

In one aspect the invention provides apparatus for supplying energy to a load, comprising:

a power supply unit having an input for receiving current at mains frequency, means for increasing said frequency to a higher frequency, an output for delivering energy at the higher frequency; and a two part induction connector having a first core portion that has a primary winding connected to the output of the power supply unit and a mating second core portion that has a secondary winding for delivering energy to a load, the core portions being of a high resistivity material.

Where "mains supply" relates to the standard local distributed electrical supply, typically 50-60 Hz, although this may be higher or lower.

The invention also provides a two-part induction connector, or primary or secondary portions thereof, for use in apparatus as aforesaid. The aforesaid two-part connector ideally is provided with interengageable formations for establishing a mechanical, as well as an inductive, connection between the two parts and preferably for holding said parts in relative attitudes such that pole pieces of said primary and secondary portions coincide in order to promote efficient inductive coupling.

Preferably the primary and secondary portions of the connector are retained together by clips or other resilient means with a minimal air gap or with a thin separating membrane of plastics or other electrically insulating material. The portions of the two part inductive connector may comprise pins and sockets that removably push together for mating the parts of the connector.

Alternatively the portions of the connector may comprise clips and recesses that removably snap together for mating first and second parts thereof. In a further alternative, they may comprise bayonet formations and recesses that removably twist together for mating the parts of the connector.

As previously explained, various forms of mechanical connection are envisaged to hold the two parts of the coupling positively together.

Desirably the core material is of a low-loss ferrite that avoids eddy currents and low hysteresis loss and does not become unduly heated at the frequencies at which energy is transmitted to optimize system efficiency.

According to another aspect the invention provides an electrical load having in a proximal region thereof a half-core of a two-part induction connector and a secondary winding on the half-core for energizing the load. A particular type of load is an incandescent lamp or a fluorescent tube having in its base a half-core of an induction connector as aforesaid and a secondary winding for energizing the lamp or tube with received energy.

The invention further provides a coupling link between a high frequency AC energy source, that is connected to a primary winding of an inductive coupler, and a load that is connected to a secondary winding of the same inductive coupler. It will be appreciated that in accordance with this embodiment, operating as a system, there is provided a coupler, functioning as a transformer that can be separated into first and second portions, permitting the energy transmission between an energy source for electrical supply applications to a load of any suitable type.

As the system does not generate any voltage or current, it is therefore inherently safe in a wide range of environments. One principal use of the invention is in the field of lighting, but other uses, for example, in electrical power circuits including: computing, telecommunications, aeronautical, marine, industrial and domestic applications are also within the scope of the invention. It will also be appreciated that as the invention utilises inductive coupling of energy it is able to be used in unsafe environments such as on gas or oil rigs, in oil refineries or other petrochemical plants, underwater or mining or other underground environments where there is a risk of explosion.

BRIEF DESCRIPTION OF THE DRAWINGS

Preferred embodiments of the invention and how it may be put into effect will now be described, by way of examples only, with reference to the drawings, in which:

FIG. 3a is a block diagram of an electronic ballast unit;

FIG. 3b is a diagram of the output waveform of the unit in FIG. 3a;

FIG. 6b is a more detailed circuit diagram of the configuration for driving a discharge tube shown in FIG. 6a;

FIG. 14a is an exploded view of an example of an LED-based downlight and connector;

FIG. 14b is an exploded view of the connector moiety;

FIG. 14c is a diagrammatic view of the lamp moiety;

FIG. 14d is a detail of the lamp and half-core;

FIG. 14e is a diagrammatic view of a downlight-type housing to which the aforesaid components may be fitted;

FIG. 15 is an exploded view of a fluorescent lamp, ceiling socket or rose and primary-side half-core;

FIGS. 16a and 16b are perspective views of the under surface and the upper surface of a power supply unit for fitting to the lamp unit of FIG. 15;

FIG. 16c shows diagrammatically windings for a three-core cable;

FIGS. 17a and 17b are perspective views of upper portions and lower portions of a plug for transmitting energy to a load;

FIG. 17c shows the plug being mated to a complementary socket;

FIG. 17d is an exploded view of a preferred embodiment of a plug;

FIG. 18a is a perspective view of a power supply with integrated primary induction coupler to accept multiple secondary induction couplers, in a parallel configuration;

FIG. 18b is a diagram showing a range of potential products that can incorporate the inductive coupler; including a series version and intelligent codeable inductive couplers;

FIG. 19 shows a two-part inductive connector in which the parts fit together bayonet-wise;

DETAILED DESCRIPTION OF PREFERRED EMBODIMENTS

Figure 1:
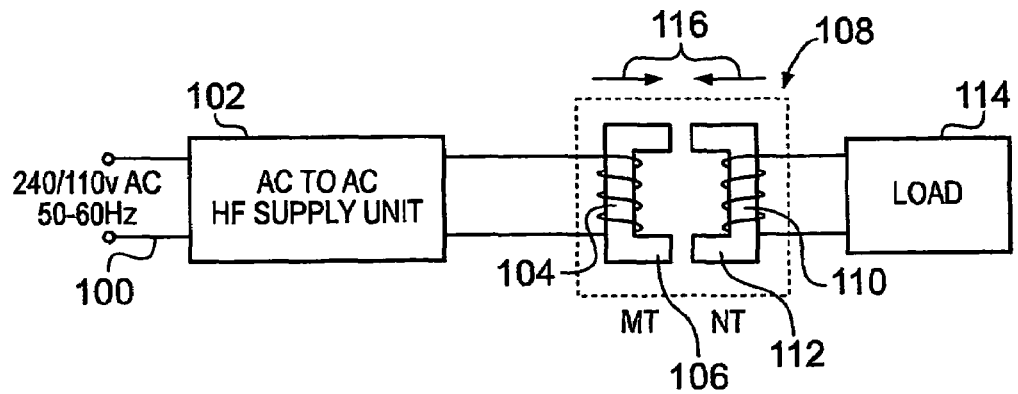
FIG. 1 shows a, basic configuration of a mains supply driving a load via a high frequency supply unit and a two-part inductive coupler.

In FIG. 1, which shows a basic configuration of a power supply arrangement according to the invention, a mains AC supply 100 at e.g. 110 or 240 V and 50-60 Hz supplies energy to a high frequency AC to AC. power supply unit 102 which feeds a primary winding 104 on half-core 106 of a split transformer 108. A secondary winding 110 on half-core 112 is connected to load 114. Examples of loads that might receive energy from the above supply include low voltage halogen lamps, other incandescent lamps, fluorescent lamps, fans, electric motors, detectors, computers, industrial, domestic devices or power distribution circuits e.g. for use in a building or part of a building or for use in outdoor lighting. The contact may be established by mating the two parts, and may be broken by separating them. The parts being relatively movable as indicated by the arrows 116.

Figures 2A, 2B:
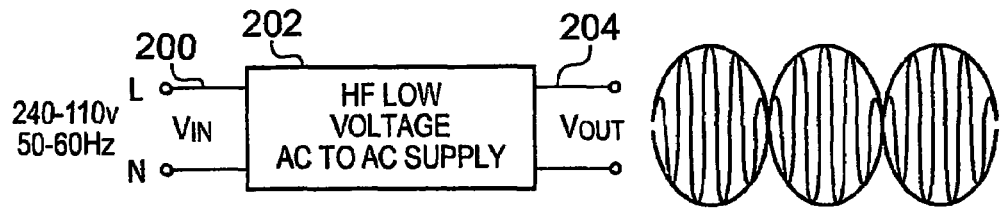
FIG. 2a is a diagram of a high frequency coupler suitable for use with low voltage lighting.
FIG. 2b is a diagram of the output waveform.

FIG. 2a shows diagrammatically a high frequency low voltage supply in which electrical energy from supply 200 is fed to high frequency low voltage AC-AC power supply unit 202, again at 110V or 240V and 50-60 Hz and produces at 204 a nominal 11 Volts AC waveform. As seen in FIG. 2b, the waveform may have e.g. a nominal 11.7 volts RMS and may comprise an AC waveform of frequency 23-100 KHz, preferably 23-60 KHz which modulates a lower frequency envelope e.g. of frequency 100 Hz (50 Hz input) or 120 Hz (60 Hz input) this energy supply arrangement being suitable e.g. for incandescent lighting. Low voltage halogen lamps have the advantages of brilliance and long life and are normally rated from 5 to 50 W drawing 0.4 A to 4 A at 12 Volts. They may be supplied in capsule or dichroic form and may be used as spotlights for installation on a string or rail or as down lights for fitting to or within a ceiling.

Figure 2C:
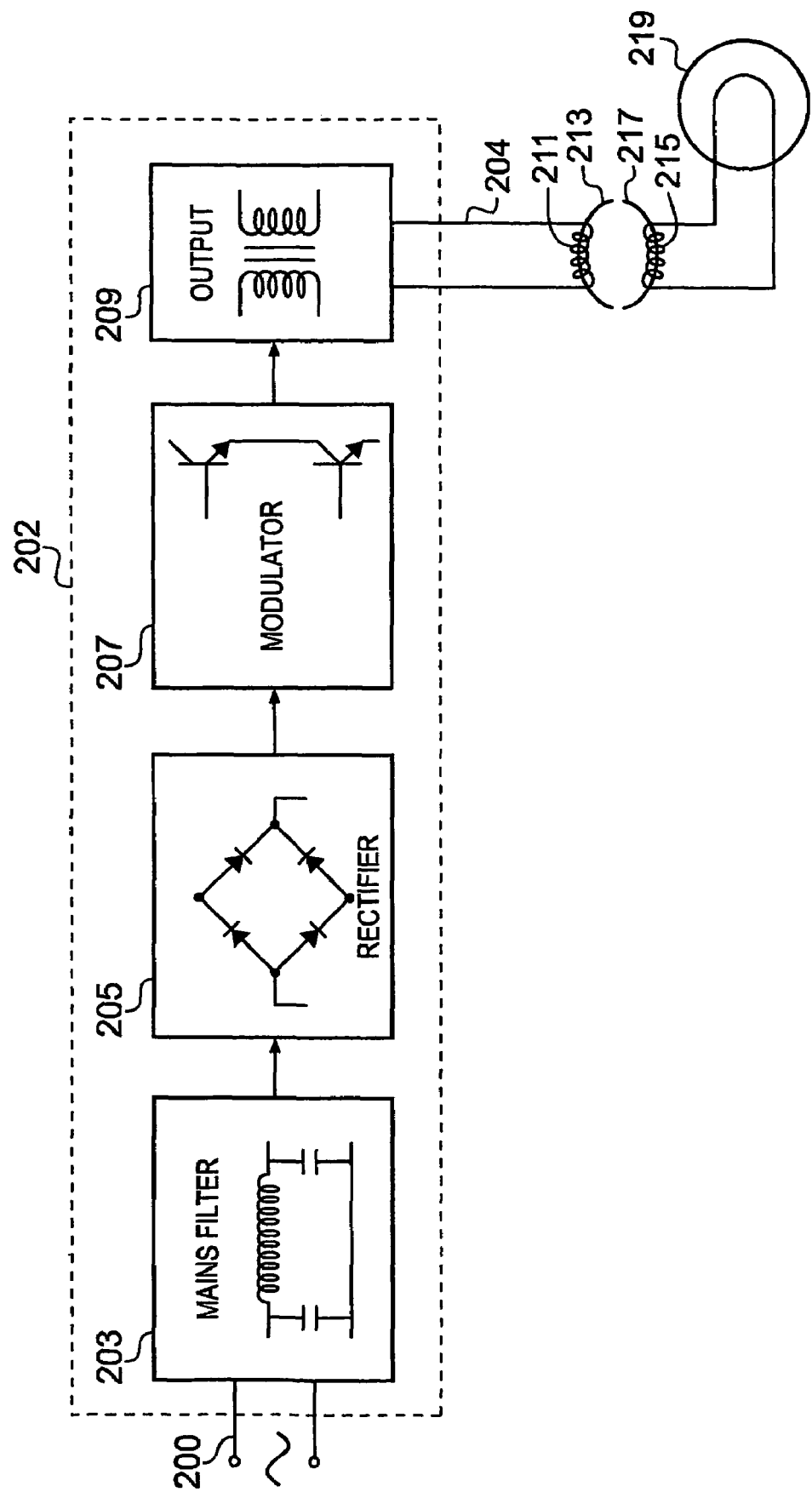
FIG. 2c is a block diagram of the unit.

The fundamental components of a switch mode power supply are shown in FIG. 2c. Energy from supply 200 passes to a power supply unit 202 having a mains filter stage 203 for suppressing mains interference flowing from the mains supply to the unit 202 and also from the unit 202 back into the mains. The filtered mains current passes to diode bridge rectifier 205 from which a rectified output at 100 or 120 Hz, depending on the supply frequency, passes to a modulator 207 which modulates the envelope to produce AC at a frequency of 23-100 kHz, preferably 23-60 kHz and most preferably about 30-50 kHz to give the waveform of FIG. 2b. The modulated signal passes to output stage 209 which supplies a 12 or 24 volt high-frequency modulated 100 or 120 Hz AC output at 204 to primary winding 211 of half-transformer 213. That half-transformer mates with half-transformer 217 having secondary winding 215 that provides energy to incandescent lamp 219.

Figure 2D:
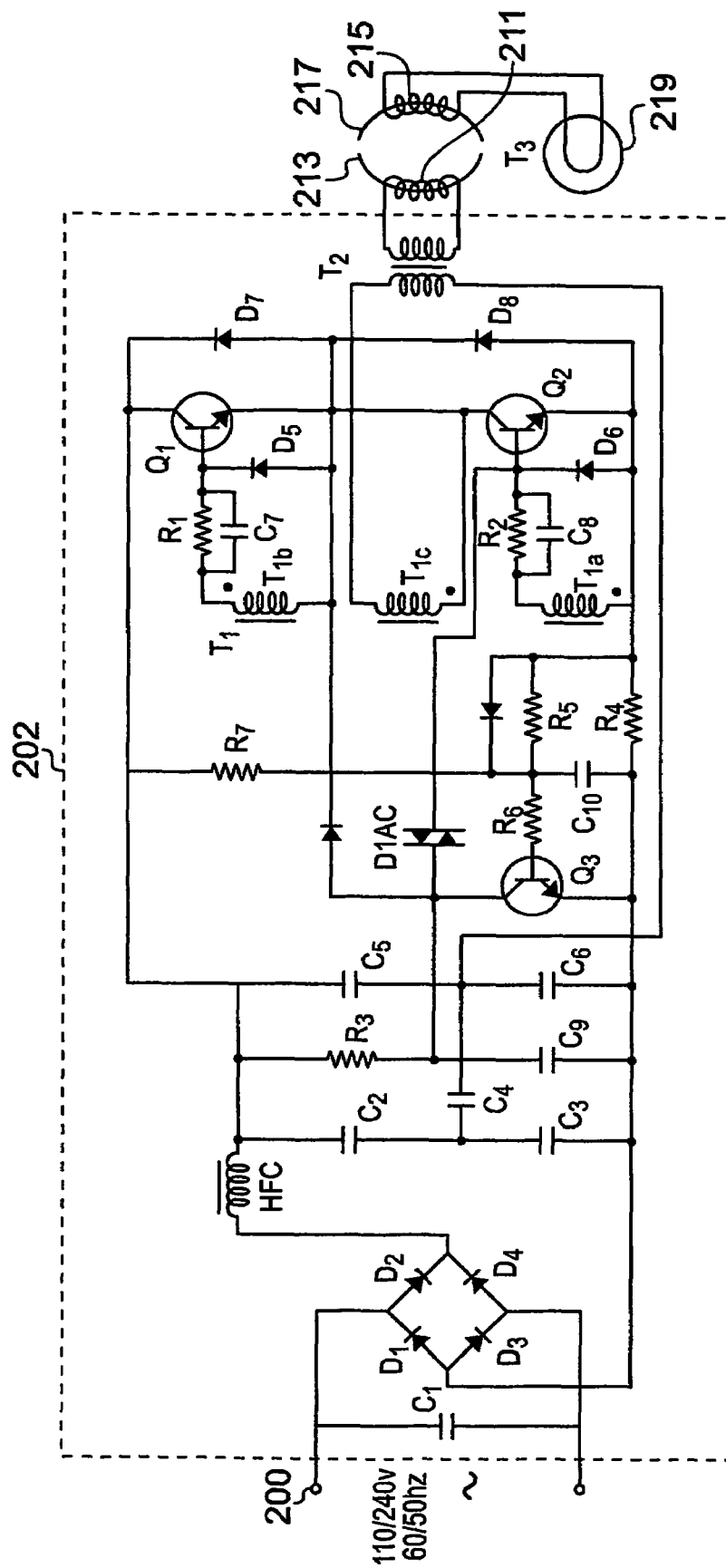
FIG. 2d is a more detailed circuit diagram of the unit.

A simplified circuit for a practical energy supply circuit is shown in FIG. 2d. An AC voltage is supplied to a full-bridge rectifier D1-D4 with a mains filter provided by capacitors C1-C3 and a ferrite choke HFC. The filtered mains current provides an envelope waveform that is modulated using a half-bridge circuit provided by transistors Q1, Q2 that conduct alternately and by capacitors C5, C6. The primary of output transformer T2 is connected across the half-bridge and an L-C self-oscillating circuit is provided by primary T1c of feedback transformer T1 that is connected in series with the primary of T2. Opposite-sense secondary windings T1b and T1a provide excitation to the bases of transistors Q1, Q2 via resistors R1, R2 and switching capacitors C7, C8. Zener diodes D5, D6 with reverse voltages provide protection for the bases of Q1,Q2, and diodes D7 and D8 provide protection for the transistors Q1 and Q2 against reverse current.

A starter circuit timed by network R3, C9 and controlled by DIAC is connected to the base of Q2. The secondary winding of T2 provides the required voltage reduction for lamp 219 and may be arranged to provide an output power of about 60 W, for driving a single lamp 219, or 200 W, for driving a plurality of lamps, via a lighting track or the like. To avoid excessive current loads, e.g. if the lamp 219 becomes open-circuit, a predetermined increase in the voltage drop across resistor R4 (which measures the current being drawn by transistors Q1, Q2) provides an activating signal via resistors R5, R6 to the base of transistor Q3 which is biased normally OFF by resistor R7. In the event of an open-circuit Q3 is switched ON so that capacitor C9 is shorted and oscillation of the half-bridge ceases. A recovery time is defined by the time constant of R5, C10 connected in the base circuit of Q3. In addition to this electronically-switched current overload protection device, there may be provided thermal protection provided by a cut-out (not shown) monitoring the temperature e.g. of the output transformer T2 or a winding thereof or Q1 or Q2.

It will be appreciated that all the circuits described above are contained in the unit 202, which is believed to be representative of devices on the market based on discrete components and bipolar transistors.

Switching mode power supplies are extensively described in the patent literature, and the technology described in such references may be applied to the invention. A circuit that can provide a constant voltage or a constant current output is disclosed in U.S. Pat. No. 3,538,518 (Allington, Instrument Specialities Company) and further designs for switched mode power supplies are described in e.g. U.S. Pat. No. 4,453,205 (Voight) and U.S. Pat. No. 4,945,465 (Marinus, Philips). Over-current control and/or overload protection are discussed in e.g. U.S. Pat. No. 4,713,740 (Drabing, SMS Advanced Power), U.S. Pat. No. 4,916,569 (Onopka, Zenith Electronics), U.S. Pat. No. 4,858,094 (Barlage, Allied-Signal), U.S. Pat. No. 5,633,787 (Song, Samsung), U.S. Pat. No. 6,434,023 (Preller, Infineon Technologies), US-A-2001/0009517 (Preller), US-A-2001/0019469 (Koh, Thomson Multimedia), and US-A2002/0105767 (Schuellein, Semiconductor Components). The latter specification reviews over-current protection schemes in detail including:

(a) pulse-by-pulse schemes that clamp the peak of the power supply output current when a sensed current magnitude exceeds a threshold current magnitude, and inhibits the power supply output by reducing the duty cycle of a power switching device;

(b) A hiccup current limit scheme which terminates power supply operation once an over-current condition is detected and attempts restart after a predetermined time period;

(c) a foldback current limit scheme which causes the power supply maximum current limit to decrease with power supply output voltage so that if the supply output voltage decreases due to an overload or short circuit, the maximum current limit also decreases so that the output current is reduced to a safe level; and (d) A latch-off protection scheme in which the power supply is completely shut down under an over-current condition and normal operation can only be restored by cycling the input voltage (ON/OFF) or toggling an ENABLE input. As previously explained, thermal protection against over-temperature is also commonly provided. The above schemes can, of course, be used in a power supply unit of the invention. A high-frequency low-cost power supply for driving 12 Volt halogen lamps is disclosed in U.S. Pat. No. 6,208,086 (Nerone, General Electric Company).

Electronic transformers that are currently available in the UK for low voltage halogen lamps include e.g. the Leax LT 60 (20-60 Watts) and PD 250 (100-250 Watts), see http://www.leax.co.uk/PDF/electronic%20transformers.pdf. Suitable HF power supplies are also available from Arlen-EFA of Slough, UK (see their TRX-105 LV transformer having a load range of 20-105 Watts, short circuit protection and overload protection), Tridonic Limited, Basingstoke, UK (TE isolating transformers also providing 20-105 Watts, having overload, overheating and short-circuit protection, and operating a lamp at 30-40 kHz; also HF ballasts, LED power supplies and discharge drivers), Osram (105 VA 12V transformers, also HF ballasts, LED power supplies and discharge drivers), and products from Black Box (LV transformer), Mode (LV transformer), Universal Light & Power (LV transformers), Multiload (VoltMaster LV transformers), Huco (LV transformers), Philips (HF ballast, LED power supplies and discharge drivers), Magnatech (HF ballast), Helvar (HF ballast, discharge driver), Transfiltala (LV transformer) and Kaoyi (JP).

Referring again to FIG. 2d, the core of two-part transformer T3 is preferably a soft metallic oxide-based ceramic or soft ferrite. Ferrite materials may be divided into three groups:

(a) Manganese-zinc ferrites $(Mn, Zn)O.Fe_2O_3$ which group is designated as H-materials, are of resistivity $10^1$-$10^3$ $\Omega$cm and is less preferred;

(b) Nickel-zinc ferrites $(Ni, Zn)O.Fe_2O_3$ which group is designated as N-materials and which may have specific resistivities of more than $10^3$ $\Omega$cm, typically $10^4$-$10^7$ $\Omega$cm and e.g. $10^4$-$10^5$ $\Omega$cm;

(c) Magnesium-zinc ferrites $(Mg, Mn, Zn)O.Fe_2O_3$ which group is designated as HR-materials. Ferrites may also contain small amounts of Cobalt, Titanium, Calcium, Silicon etc to obtain particular desired properties. The ferrite may be a Mn—Zn ferrite but is preferably a Ni—Zn ferrite on account of higher intrinsic resistivity and low core loss, suitable grades being N27 and N67.

Figures 3A, 3B:
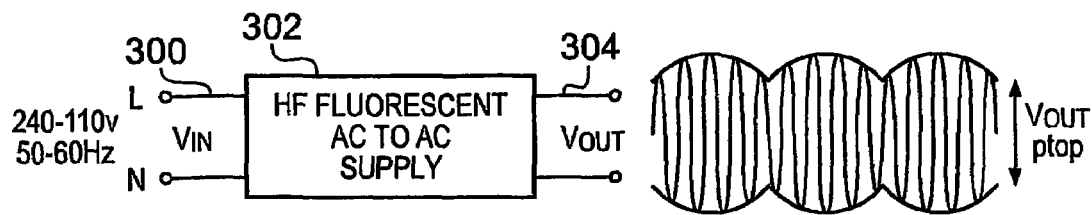

For fluorescent lamps, a high frequency AC-AC supply is used. The electrical energy supply shown in FIG. 3a is similar, with mains supply 300, supply unit 302 and output 304, but in this instance the output has a RMS voltage of 240V at a frequency of 23-100 kHz and with a ripple frequency of e.g. 100 Hz. In the past, conventional fluorescent lighting systems have been operated from the mains using a series choke as ballast for creating sufficient voltage to operate the lamp and a glow starter to start the lamp and to limit the lamp current after it has started. Although such a system is low cost, it suffers the disadvantages of audible hum, energy loss in the choke, delay in ignition and flicker. Use of electronic ballast to energise the lamp involves rectification of an AC mains voltage to a DC voltage, which is then inverted to a high frequency AC voltage for driving the lamp.

Electronic ballast operates at a frequency of typically 20-60 kHz and the higher operating frequency improves efficiency by about 10%, because an increase in phosphor excitation eliminates flicker, improves speed of ignition and extends lamp lifetime. Electronic ballasts also consume less energy than magnetic chokes and using switch mode techniques the combined energy saving can be about 25% with the same light output and with reduction in size of driving electronic circuits. The high frequency AC from an electronic ballast can also be used with the above mentioned switch mode techniques and with a two-part coupling transformer based on ferrite half-cores. Switched mode power supplies for fluorescent lamps are disclosed, for example, in U.S. Pat. No. 5,065,074 (Hesketh, Coolite), U.S. Pat. No. 5,359,274 (Bandel, Philips), U.S. Pat. No. 5,796,597 (Fitzgerald. Thomson), U.S. Pat. No. 6,100,647 (Giannopoulos, Philips).

Figure 4:
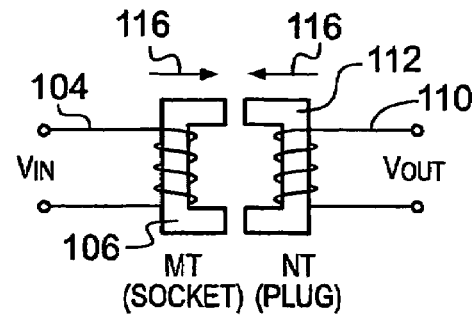
FIG. 4 is a detailed view of a two-part induction coupling.
Figure 5:
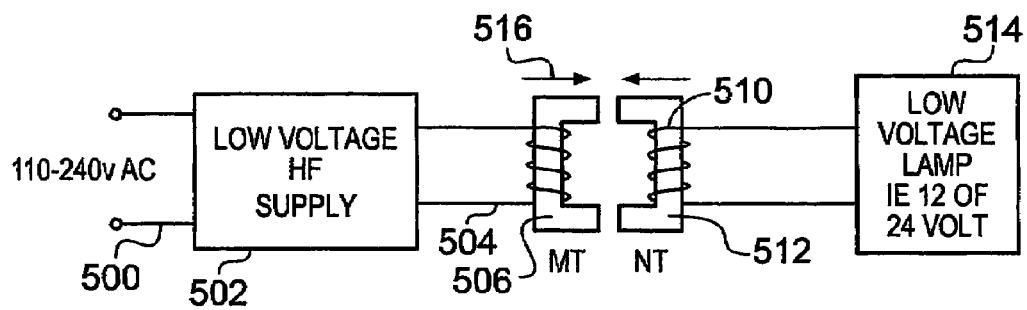
FIG. 5 is a block diagram of a configuration of the inductive coupling system configured for use with low voltage lamps.
Figure 6A:
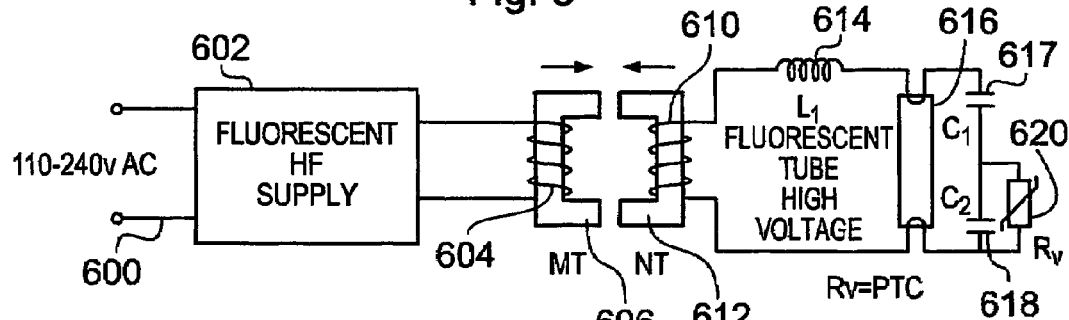
FIG. 6a is a block diagram of a configuration for driving a discharge tube.

FIG. 4 is a detail of the split transformer with a supply side or socket winding 104 having turns NT and an output or plug side winding having turns MT. For step up Vout, NT/MT>1 whereas for step down Vout, NT/MT<1. Thus in the example of FIG. 5, components 500-512 correspond to those previously described, MT is for example four turns, NT is four turns also to deliver an output RMS of 12 V to low voltage lamp 514 and NT is 8 turns to deliver 24V to the lamp. In the example of FIG. 6a, components 600-612 correspond to those previously described, MT is for example 91 turns, NT is also 91 turns to deliver an output RMS to a lamp circuit. One side of secondary winding 610 is connected to ballast inductance 614 in series with one electrode of fluorescent lamp 616 and is series connected via series capacitors 617, 618 and bridging variable resistor 620 (620: Rv=positive temperature coefficient PTC) to the other electrode of the lamp 616 which in turn is connected to the other side of secondary winding 610.

Figure 6B:
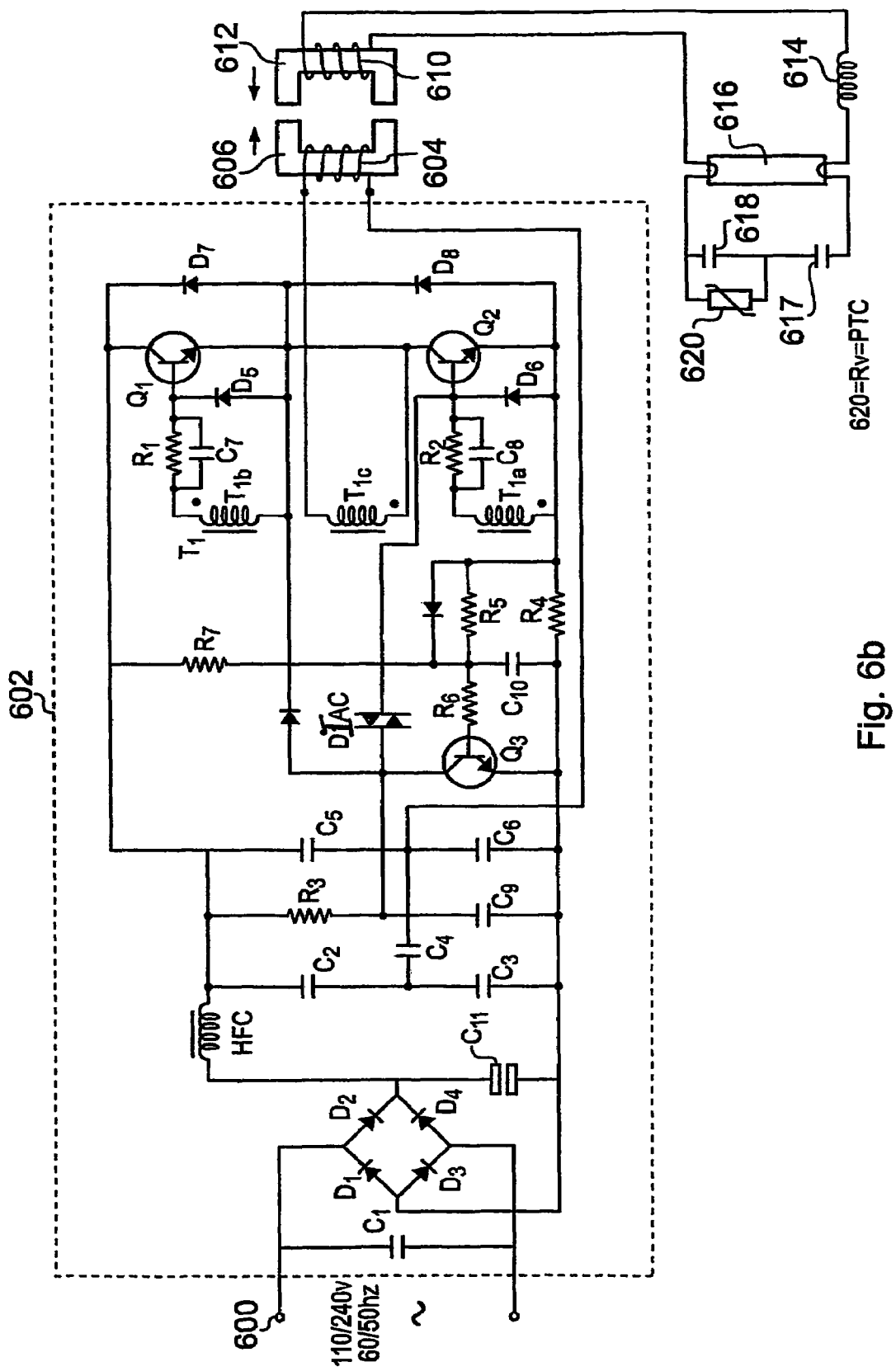

A more detailed circuit is shown in FIG. 6b, which is similar to FIG. 2d except that electrolytic capacitor C11 is connected between one side of the rectifier and the negative rail, the output transformer T2 is deleted and the primary of the two-part transformer is connected across the half bridge in series with feedback coil T1c.

Figure 7A:
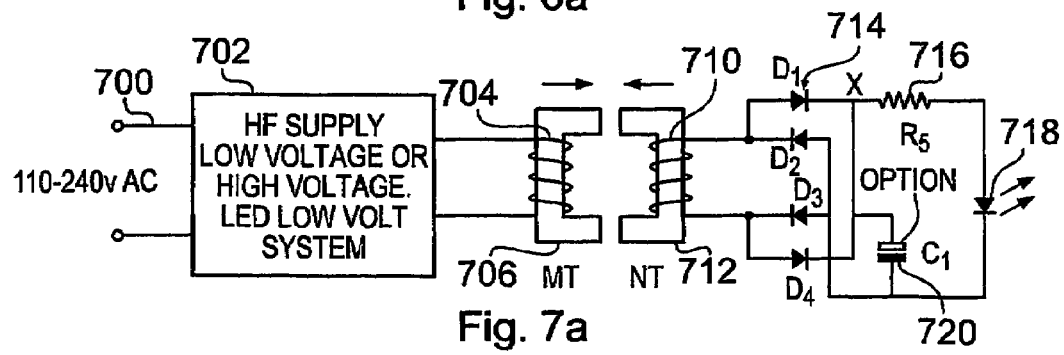
FIG. 7a is a block diagram of a configuration for driving a light emitting diode (LED) lamp.
Figure 7B:
FIGS. 7b and 7c show possible output waveforms.
Figure 7C:

In the further example of FIG. 7a, components 700-712 correspond to those previously described, and winding 710 is connected across HF diodes D1-D4, connected as a bridge rectifier 714 that supplies DC energy via series resistor 716 and optional HF capacitor 720 to light-emitting diode (LED) 718. The output of the supply unit 702 may be a HF modulated DC, as at FIG. 7b, or as HF DC as at FIG. 7c.

Figure 8:
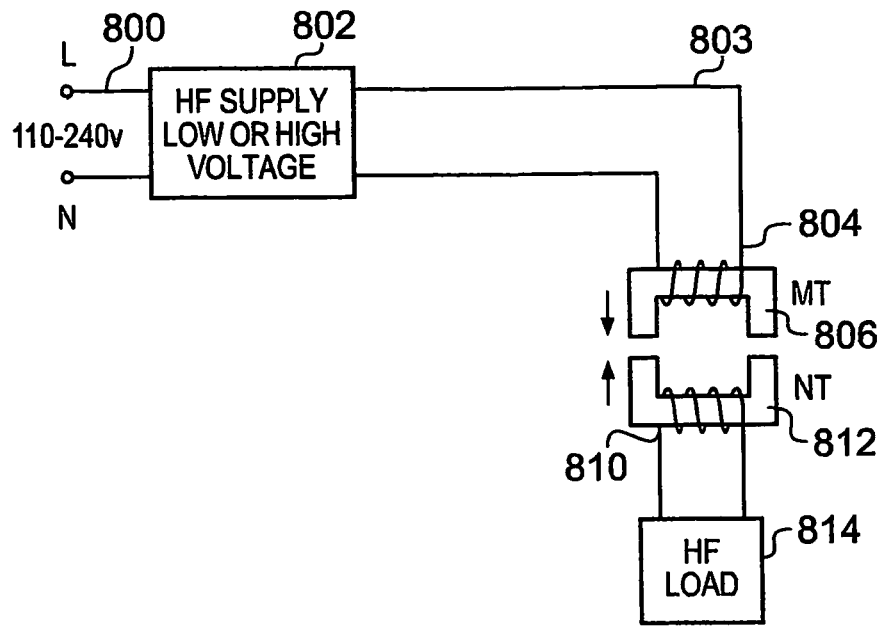
FIG. 8 is a block diagram of a wire loop system.
Figure 9:
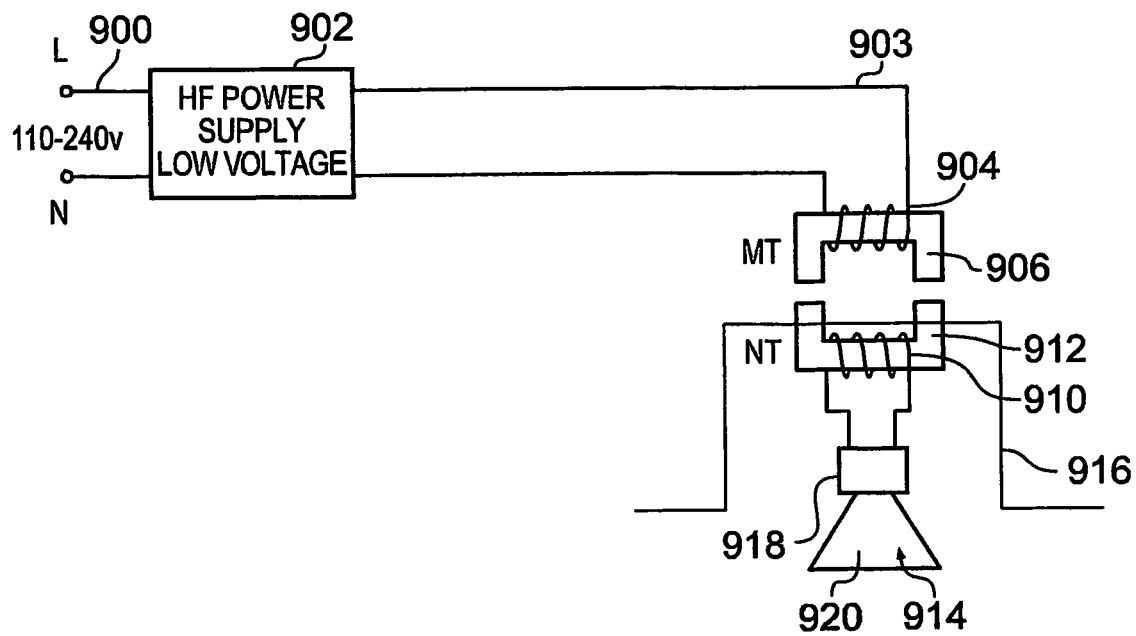
FIG. 9 is a block diagram of a low voltage lamp used as a downlight.

Wire loop systems are shown in FIGS. 8 and 9. In FIG. 8 the parts 800-814 are as previously described and the primary winding 804 is at an arbitrary location on a single wire loop 803. Transmission of energy from supply 802 to load 814 can be established without cutting any wires or piercing the insulation layer at the winding 804 and therefore can be repositioned without any damage to cables thereof.

In FIG. 9 the wire loop 903 and the socket-half 904, 906 of the present connector form part of lighting wiring built into the building. Plug parts 910 and 912 form part of a light fitting 916 built into a ceiling of the building and the light filling has a conventional socket 918 for a conventional low voltage incandescent lamp 920 which provides the load 914 generally indicated in this instance by an arrow. The required connection can be established without using terminal blocks or cut wires, which reduces the skill required to fix the fitting 916 in position.

Figure 10:
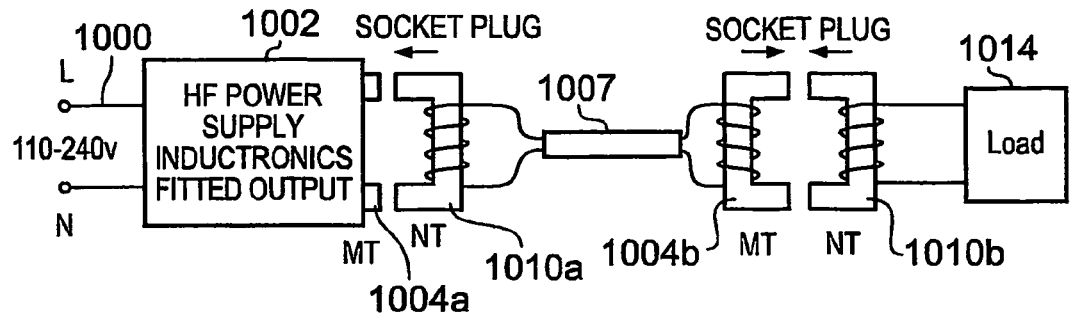
FIG. 10 is a block diagram of a system using two induction couplers and a linking cable.

In FIG. 10, a mains supply 1000 feeds high frequency power supply unit 1002 which outputs into a first two-part connector 1004a, 1010a connected by cable 1007 to second two-part connector 1004b, 1010b which in turn is connected to load 1014, thereby providing an indirect connection between the power supply 1002 and the load 1014.

Figure 11:
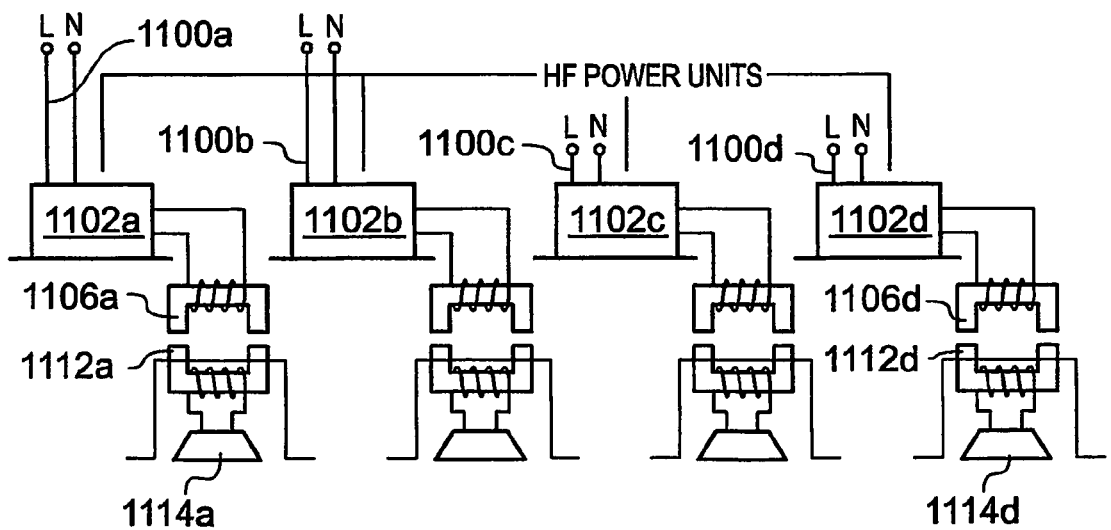
FIG. 11 is a block diagram of a lighting system in which lamps are powered by individual associated power supply units.
Figure 12:
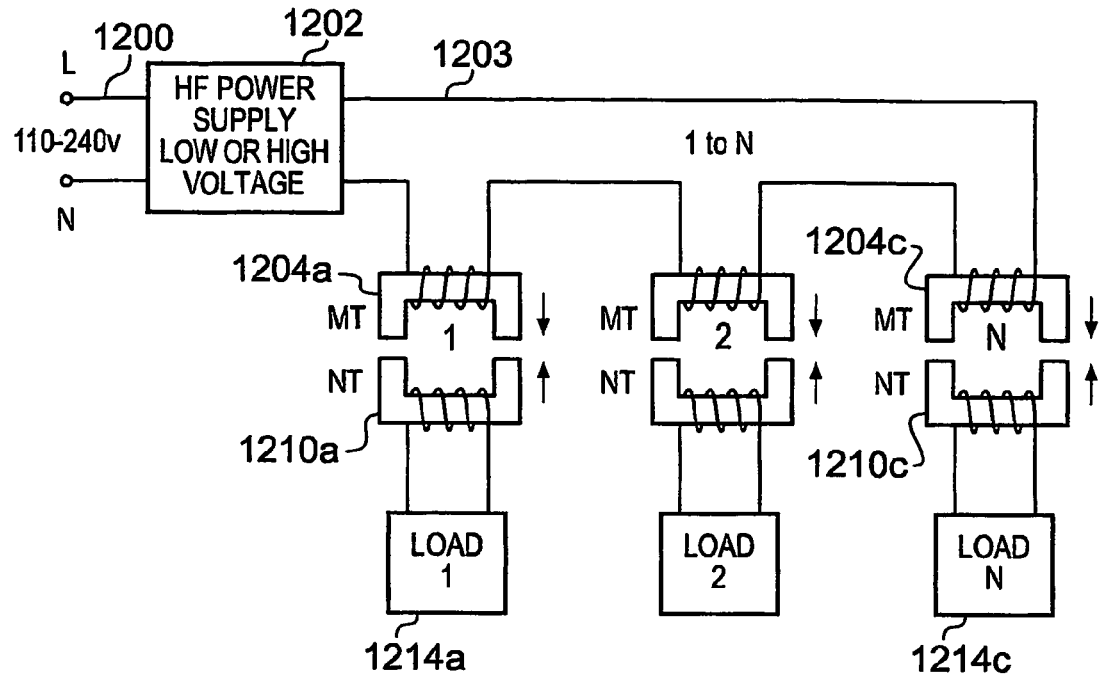
FIG. 12 is a block diagram of lamps driven in series from a single power supply unit.
Figure 13:
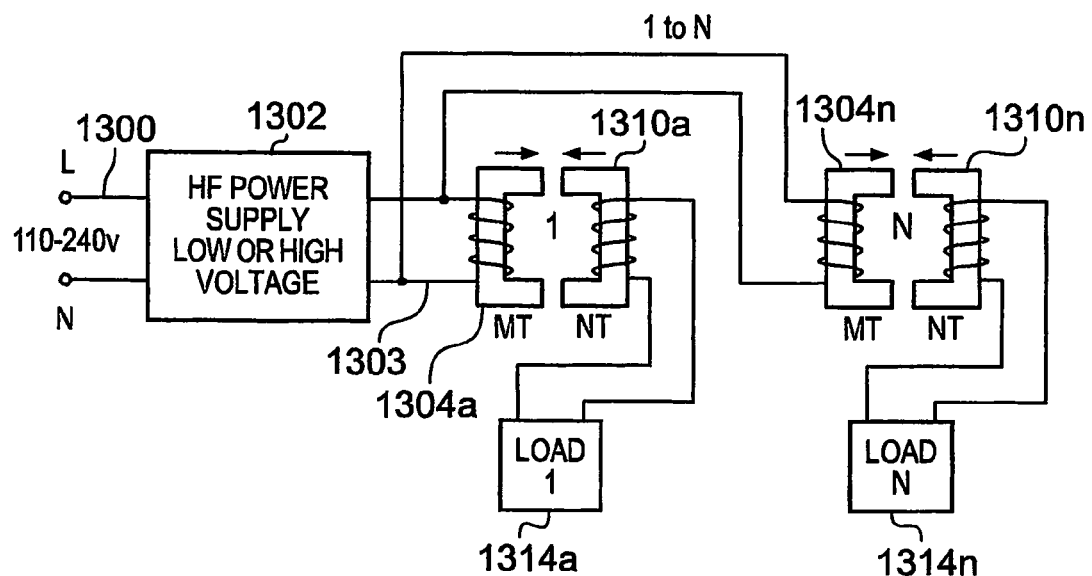
FIG. 13 is a block diagram of lamps driven in parallel from a single power supply unit.

Various possibilities for providing lighting units with the two-part inductive connectors described above are shown in FIGS. 11-13. In FIG. 11, mains supplies 1100a-1100d provide energy to individual power supply units 1102a-1102d connected by respective two-part connectors 1106a-1106d, 1112a-1112d to loads 1114a-1114d in the form of lighting units. Installation of the system requires no cut wires and simply relies on loops of wire through the ceiling. No terminal blocks need be used, and the individual lighting units are easy to install and replace. In FIG. 12, a mains supply 1200 feeds supply unit 1202 having a ring providing energy to series arranged connectors 1204a-1204c, 1210a, 1210c connected to respective loads 1214a-1214c (1<c<n). The arrangement of FIG. 13 is similar except that the connectors 1304a-1304n, 1310a-1310n are connected to the unit 1303 in parallel.

The present invention can provide electrical wiring for a building in which, for example in a lighting circuit the overall number of screw-in or push-in terminations can be reduced. Most electrical fires start in cables or terminations owing to breaks and arcing. The greater the number of terminations, the greater the risk of fire or electric shock. Furthermore, making terminations is the most time-consuming and hence costly part of any electrical installation, requiring skilled labour. The fewer the number of terminations, the fewer the mistakes that can be made. Lighting installations are particularly difficult and time consuming because the outlet has to be installed in a ceiling at height, upside-down and against gravity. Several connections are required: a live earth neutral, a switched live and often a permanent live. Low voltage installations require transformers and greater current and risk of arcing. In addition to electrical connections, mechanical fixings are required and the weight of the luminaire has to be supported while connections are being made.

Use of a two-part induction connector to provide power connections to a LED-based lighting installation is shown in FIGS. 14a-14f. A lamp holder body 1401 of polycarbonate or other electrically insulating plastics material is provided with a top opening for receiving a ferrite half-core 1403 carrying a primary winding 1404, and has fixing flanges and depending clips 1407. A lamp holder 1409 has a die-cast aluminum reflector 1411 attached to a polycarbonate rear housing 1413 in which is fixed a complementary second ferrite half-core 1415. Upwardly facing latch tongue 1417 can be demountably engaged into the clips 1407 to fasten the lamp holder in position. The lamp holder 1409 also supports a LED lamp such as a Luxeon (Trade Mark) LED which can receive energy via secondary winding 1420 with the addition of a rectifying bridge and associated components see FIG. 7a on half-core 1415. The snap engagement of tongue 1417 between clips 1407 and resilience of the materials used enables the half-cores 1403, 1415 to be urged positively into face-to-face contact, minimising the air gaps between them and consequential energy losses. An OEM-manufactured housing 1422 is designed to be recessed into a ceiling and has a top face 1424 formed with an aperture 1426 through which the extremities of primary half-core 1403 depend and into which tongue 1417 of the lamp holder 1409 can be inserted for engagement with the clips 1407. The flanges 1405 of the body 1401 are attached to the flanges 1405 by bolts or studs (not shown). Energy for the primary winding 1404 comes from HF transformer 1430 connected to mains supply and having an output wire loop 1432 that can be wound onto the half-core 1403 to provide the primary winding. It will be appreciated that an incandescent lamp, e.g. a low-voltage dichroic lamp may be used in place of the LED.

An installation for a fluorescent lamp working at mains voltage is shown at FIG. 15. Tubes 1500 depend from a body 1502 housing the ballast and starting circuitry shown in FIG. 6a on a small circuit board and having a secondary winding around a load half-core 1504 which appears at a top face of the body 1502. A ceiling rose 1506 has depending walls 1508 between which the body 1502 is a sliding fit, and latch tongues 1510 also depending from the rose 1506 slide over recessed surfaces 1512 of the body and snap engage locking surfaces 1514 to hold the body 1502 positively into the rose 1506. A second half-core 1516 around which is wound primary winding loop 1518 is a sliding fit between upstanding walls 1520, 1522 and is retained in position by snap engagement of clips 1524. Again the use of resilient clips enables the half-cores 1504, 1516 to be urged positively together in face-to-face contact. In FIGS. 16a, 16b, there is shown a power supply unit 1602 fed with mains voltage via a supply cable 1600 and having a circuit e.g. as shown in FIG. 6b. From the underside of the unit 1602 there appear pole pieces of a half core 1616 arranged to clip into the socket defined by walls 1520, 1522 of the rose 1506. Latching surfaces on the pole pieces 1616 enable the power unit to be clipped into the socket in either the vertical attitude of FIG. 16a or the horizontal attitude of FIG. 16b.

FIG. 16c shows multiple secondary windings from an induction coupler. In FIGS. 17a-17d, a plug and socket connector for a load which may be a lamp or other electrical device has a load supply cable 1700 leading to a plug body 1702 having first and second pole-pieces 1704, 1706 of a inductive half-core and on opposite edges of the body 1702 first and second forwardly or downwardly protuberant clips 1708, 1710. The plug connector mates with a complementary socket portion 1712 fed with energy using a unit e.g. as described with reference to FIG. 2d or FIG. 6b and protected if desired by a thin membrane of plastics or other suitable electrically insulating material. As seen in FIG. 17d, the plug body comprises upper and lower portions 1702a, 1702b that fasten together by screws 1713 and it encloses inductive core 1714 wound with a secondary winding leading to cable-receiving terminals 1715.

Although the present embodiment is based on clips that positively hold the mating components together so that the inductive half-cores are held positively in contact to minimise air-gaps and consequent energy losses, it may be sufficient to provide two or three plain pins protruding from the secondary or plug part for receiving in sockets in the primary or socket part. The pins and sockets may be of metal or plastics material but are electrically isolated and do not participate in the connection except, perhaps to provide an earth line for protecting the load. The plug unit 1702 can be wound with a specific number of turns as shown in FIG. 4 (NT) to provide a specific output voltage.

FIG. 18*a* shows a mains cable 1800 leading to a high frequency transformer or ballast unit 1802 having at one end first and second exposed pole pieces 1804, 1806 of a primary side half-core that take the form of rails. A plurality of sockets are formed above and below the rails 1804,1806 at spaced intervals there along. Plug connectors 1810 fit to the sockets in side by side relationship and contain half-cores that mate with the rails 1804, 1806, and first and second protuberant clips 1812, 1814 that snap into the sockets 1808. Secondary windings in the connectors 1810 lead to load cables 1816. Various configurations are shown in FIG. 18*b* which is believed to be self-explanatory, which can provide series or parallel connections with varying output voltages and optional passive or codeable (intelligent) couplers.

FIG. 19 shows an appliance-mounted coupler 1900 that is a twist or bayonet fit to a BESA box 1902 for establishment of inductive and mechanical connections therebetween.

Figure 20:
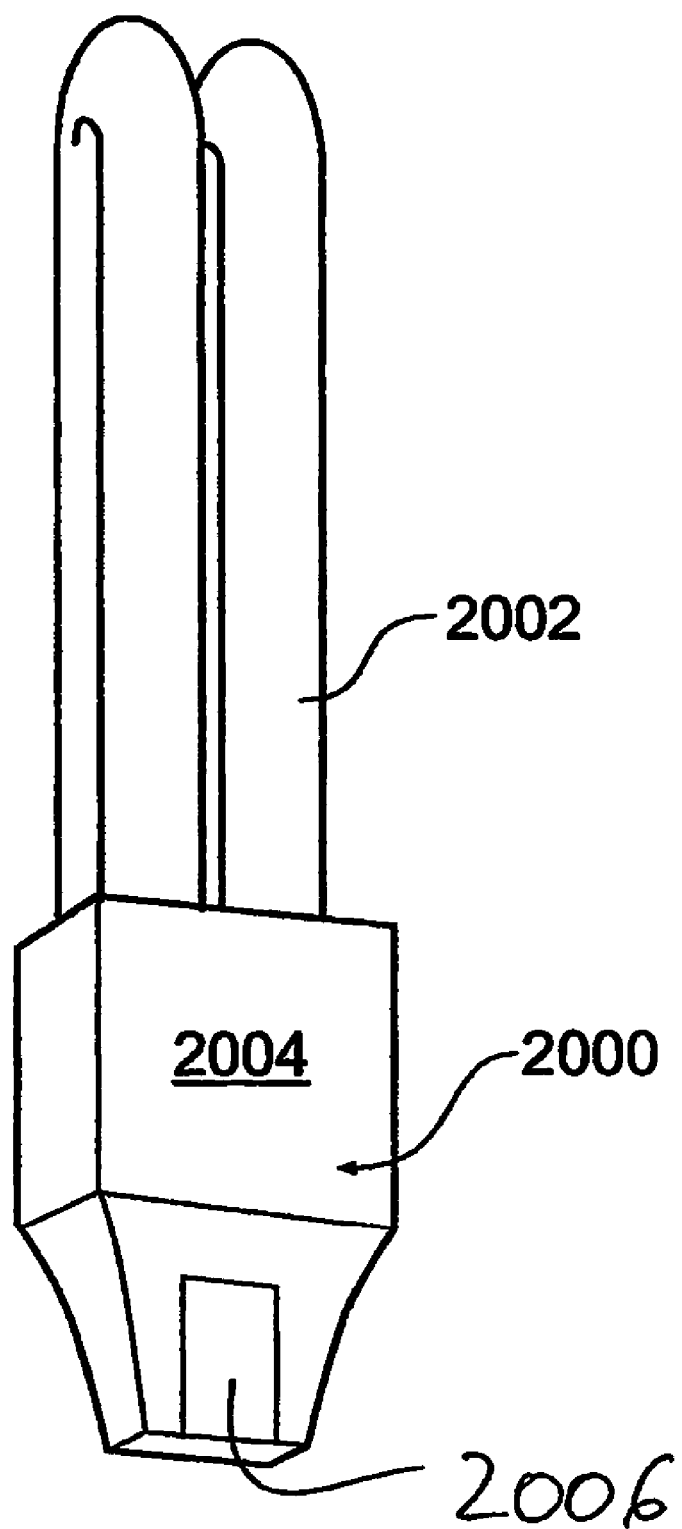
FIG. 20 shows a fluorescent lamp having a moiety of a two-part connector and associated driving circuitry built into its proximal end.
Figure 21:
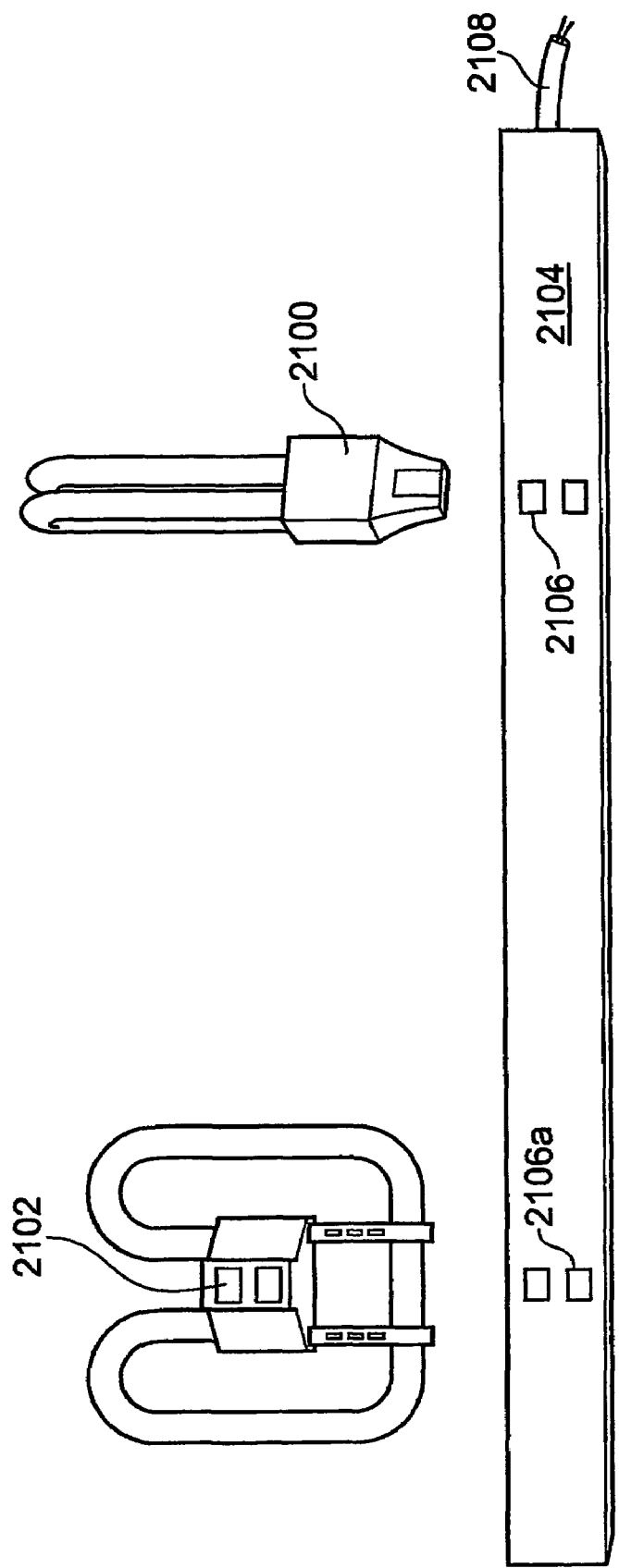
FIG. 21 shows a pair of fluorescent lamps together with a track having points at which the lamps may be driven.

FIG. 20 shows a fluorescent lamp 2000 having a fluorescent tube 2002, a proximal region 2004 housing the circuitry Ref: 6*a* for driving the lamp, first and second pole pieces 2006 for establishing an energy-transmitting induction coupling to a socket and opposite first and second fastening members for establishing a mechanical connection between the lamp and the socket. The mechanical connection may take the form of clips that positively hold the lamp in place, a screw connection or bayonet projections, provided that the connections require the lamp to be fastened in place in the correct attitude for face-to-face contact between its pole pieces and those of the socket. As apparent from FIG. 21, fluorescent lamps 2100, 2102 may be powered at socket locations 2106, 2106*a* spaced along a track 2104 that may house a high frequency electronic ballast unit of the kind shown in FIG. 6*b* and fed with mains voltage by cable 2108.

Figure 22A:
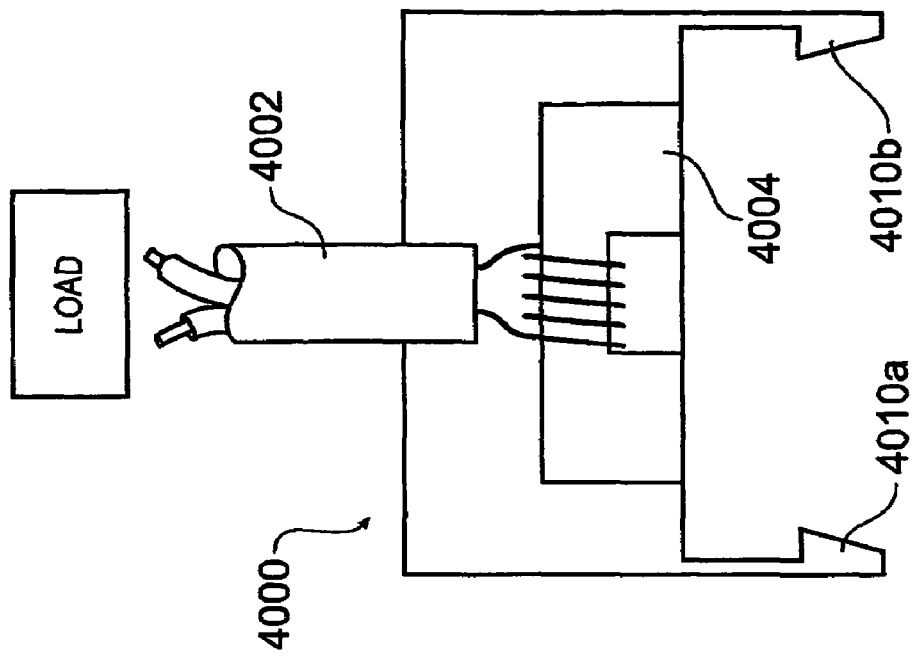
FIG. 22a shows a socket for receiving the plug shown in FIG. 22, a secondary induction coupler is adapted for connection to a primary induction coupler as shown in FIG. 22.
Figure 22:
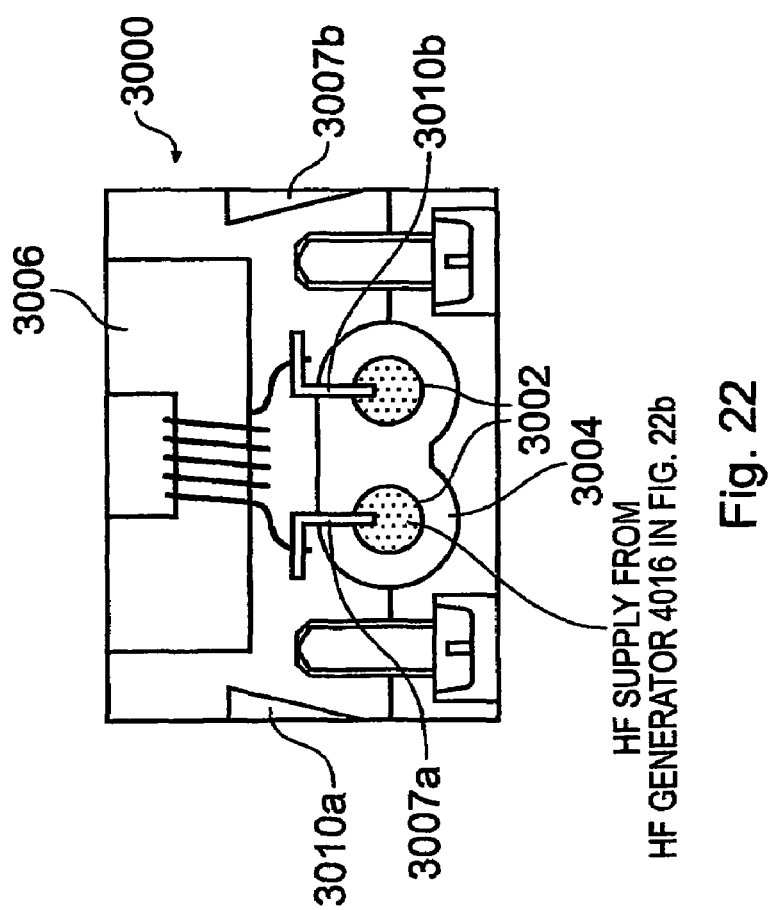
FIG. 22 shows a plug as part of a two-wire system comprising a large diameter two-core supply cable abridged by a primary inductive coupler by means of insulation displacement type device.

FIG. 22 has a primary induction coupler 3000, in the form of a plug, that could be of a codeable type as aforesaid and shows a two-wire system 3002 comprising a large diameter two-core supply cable 3004 abridged by a primary inductive core 3008 by means of insulation displacement type device 3007*a* and 3007*b*. A codeable device (not shown) may be used to transmit signals that are received by an electronic or 'smart' receiver (not shown) associated with each load. For example a particular load, such as a lamp, may have its own address, which can be programmed into an electronic memory device, such as an electronic erasable read-only memory (EEPROM), and used to selectively switch on and off or dim, the, or each load. It will be appreciated that the configuration of primary and secondary portions may be reversed so that several primary portions can be arranged to couple energy to a single secondary portion.

FIG. 22*a* shows a secondary induction coupler 4000 that could be connected to a primary induction coupler 3000 as shown in FIG. 22. The arrangements in FIGS. 22 and 22*a* may be envisaged as plug 3000 and socket 4000 respectively. Although FIG. 22 depicts a plug 3000 having a primary core 3006 and a socket 4000 having a secondary core 4004, it will be appreciated that the secondary core portion 4004 may be located within a housing of the plug 3000. Ideally the plug 3000 housing has a suitable fastening or connecting means 3010*a* and 3010*b* that enables the plug 3000 to be demountable or disengageable with respect to the socket 4000, by way of similar attachment means 4010*a* and 4010*b*. The fastening means 3010*a* and *b* and 4010*a* and *b*, may include, for example, bayonet formations, a screw formation, clips, catches or a slidable engagement mechanism.

Likewise it will be understood that the socket 4000 in electrical connection with a high frequency supply may have a primary core portion located therewithin, the socket being adapted to receive at least one plug 3000.

Figure 22B:
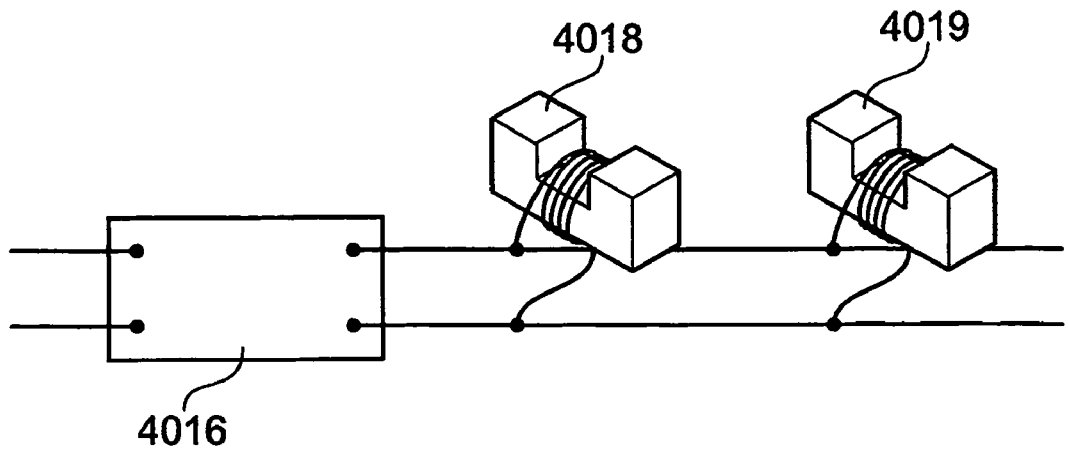
FIG. 22b shows a schematic of a mains supply entering an HF generator feeding a large diameter two-core output cable abridged by parallel primary induction couplers.

FIG. 22*b* shows a schematic of a mains supply entering a high frequency (HF) generator 4016 feeding a large diameter two-core output cable 3004 abridged by parallel primary induction couplers 4018 and 4019. This diagram illustrates that primary core portions can be located in direct electrical connection with the HF generator 4016 for connection with one or more secondary connectors (not shown).

Figure 22C:
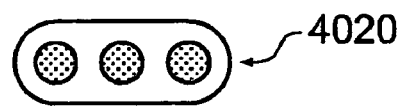
FIG. 22c shows a section through a large diameter 3 core cable used where an integrated "Earth" terminal is required and is suitable for use within an insulation displacement connector (IDC) system providing "Earth" continuity.

FIG. 22*c* shows a section through a large diameter 3 core cable 4020 used where an integrated "Earth" terminal is required and is suitable for use within an insulation displacement connector (IDC) system providing "Earth" continuity. The IDC system enables direct penetration of an outer, insulating sleeve of current carrying cables with minimum risk of exposing conductive surfaces. Use of the invention with such a system is therefore considered to meet high safety standards.

Figure 23:
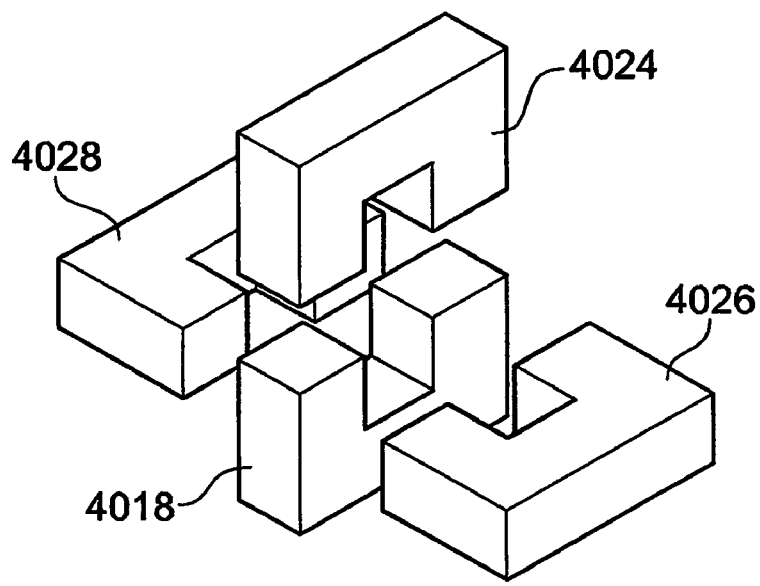
FIG. 23 shows a schematic view of a multi faceted induction coupling system allowing multiple primary and or secondary connections.

FIG. 23 shows a schematic view of a multi faceted induction coupling system allowing, according to one embodiment, a plurality of secondary portions 4024, 4026 and 4028 to receive energy from a single primary portion 4018. It will be appreciated that the configuration of primary and secondary portions may be reversed so that several primary portions can be arranged to couple energy to a single secondary portion.

The amount of energy coupled from one portion to another may be varied by displacing the relative orientation of respective primary and secondary portions. For example, by rotating the first connector with respect to the second, the amount of coupled energy is varied as the amount of common effective coupling surfaces, from each of the first and second portions, varies. The volume of the primary and secondary cores may also be varied; so that they could be cubic or circular or toroidal or frustoconical. Likewise the shape of the effective surfaces of the primary and secondary cores may vary, so that they may be circular, square, triangular or any other shape.

It will be appreciated that the transfer of energy is achieved by coupling magnetic energy without conducting current at the point of connection and thereby achieves an intrinsic safe as removes arcing and electric shock.

The invention has been described by way of exemplary examples only and it will be appreciated that variation may be made to the examples described without departing from the scope of the invention.

The invention claimed is:

1. An apparatus for supplying energy to a load, comprising:
   a power supply unit having an input for receiving current at mains frequency, means for increasing said frequency to a higher frequency, and an output for delivering energy at said higher frequency;
   a two part induction connector having a first core portion that has a primary winding connection connected to said output of said power supply unit and a second core portion that has a secondary winding connection for delivering energy to a load; and
   wherein said first and second core portions being of a high resistivity material;
   wherein said first and second core portions of said induction connector are of a material having a bulk resistivity of at least $10^3$ $\Omega$cm.

2. The apparatus for supplying energy to a load as set forth in claim 1, wherein said first and second core portions of said induction connector are adapted to mate and be disengaged one from another.

3. The apparatus for supplying energy to a load as set forth in claim 1, wherein said means for increasing said frequency to a higher frequency is arranged to step-up said mains frequency to a frequency of 23 kHz-10 MHz.

4. The apparatus for supplying energy to a load as set forth in claim 1, wherein said means for increasing said frequency to a higher frequency is arranged to step-up said mains frequency to a frequency of 25-60 kHz.

5. The apparatus for supplying energy to a load as set forth in claim 1, wherein said means for increasing said frequency to a higher frequency is arranged to step-up said mains frequency to a frequency of 30-50 kHz.

6. The apparatus for supplying energy to a load as set forth in claim 1, wherein said means for increasing said frequency to a higher frequency further comprising an electronic transformer and a means for delivering a modulated DC supply at a predetermined voltage.

7. The apparatus for supplying energy to a load as set forth in claim 6 further comprising an over-current protection system.

8. The apparatus for supplying energy to a load as set forth in claim 6 further comprising a load short-circuit protection system.

9. The apparatus for supplying energy to a load as set forth in claim 1, wherein said means for increasing said frequency to a higher frequency includes a power supply selected from the group consisting of switched mode power supply and quasi mode power convertor.

10. The apparatus for supplying energy to a load as set forth in claim 1, wherein said means for increasing said frequency to a higher frequency is an electronic ballast.

11. The apparatus for supplying energy to a load as set forth in claim 1, wherein said first and second core portions of said induction connector are of a material having a bulk resistivity of at least $10^4$ $\Omega$cm.

12. The apparatus for supplying energy to a load as set forth in claim 1, wherein said first and second core portions are of a nickel-zinc ferrite.

13. The apparatus for supplying energy to a load as set forth in claim 1, wherein said first and second portions of said two-part induction connector further comprising pins and sockets that removably push together for mating together said first and second portions of said connector.

14. The apparatus for supplying energy to a load as set forth in claim 1, wherein said first and second portions of said two-part induction connector further comprising clips and recesses that removably snap together for mating said first and second portions of said connector.

15. The apparatus for supplying energy to a load as set forth in claim 1, wherein said first and second portions of said two-part induction connector further comprising bayonet formations and recesses that removably twist together for mating said first and second portions of said connector.

16. The apparatus for supplying energy to a load as set forth in claim 1, wherein said load is at least one lamp selected from the group consisting of mains incandescent lamps, low-voltage incandescent lamps, light-emitting diodes and fluorescent lamps.

17. The apparatus for supplying energy to a load as set forth in claim 1, wherein said load is a plurality of lamps in parallel.

18. The apparatus for supplying energy to a load as set forth in claim 1, wherein said load is a plurality of lamps in series.

19. The apparatus for supplying energy to a load as set forth in claim 1, wherein said load is a plurality of lamps on a wire or track.

20. The apparatus for supplying energy to a load as set forth in claim 1, wherein said load is selected from the group consisting of an electric motor, a power supply for a computer, radio, television, and a heater.

21. The apparatus for supplying energy to a load as set forth in claim 1, wherein said primary connection has a multi faceted primary induction connector adapted to couple energy to at least one secondary connectors.

22. The apparatus for supplying energy to a load as set forth in claim 1, wherein said secondary connection has a multi faceted secondary induction connector adapted to couple energy from at least one primary connectors.

23. The apparatus for supplying energy to a load as set forth in claim 1, wherein said two-part induction connector being adapted to receive a two-core cable, there being a primary core for providing a primary induction connection having a wire wound around said core, said wire being connected to said two-core cable by an insulation displacement connector device.

24. The apparatus for supplying energy to a load as set forth in claim 23, wherein said two-part induction connector further comprising a third wire for providing an additional earth connection.

25. The apparatus for supplying energy to a load as set forth in claim 1, wherein said two-part induction connector being capable of providing a voltage in dependence upon the number of windings on said secondary core.

26. The apparatus for supplying energy to a load as set forth in claim 1, wherein said two-part induction connector has an output voltage from said secondary connection selected from the group consisting of alternating current (AC) and direct current (DC).

27. The apparatus for supplying energy to a load as set forth in claim 1, wherein said two-part induction connector are rotatable with respect one to another thereby varying the amount of energy coupled from said primary core portion to said secondary core portion.

28. The apparatus for supplying energy to a load as set forth in claim 1, wherein said core portions are rotatable with respect one to another thereby providing a dimmer switch.

29. The apparatus for supplying energy to a load as set forth in claim 1 further comprising a switching effect achievable by increasing the air gap between surfaces of said primary core and said secondary core portions.

30. The apparatus for supplying energy to a load as set forth in claim 1, wherein said two-part induction connector further comprising a low reluctance material.

31. The apparatus for supplying energy to a load as set forth in claim 1, wherein said two-part induction connector characterized in that said primary and secondary portions are formed in a shape selected from the group consisting of a toroid, rhomboid, cube, parallelepiped, hemisphere, frusto-conical, and circular symmetric solids.

32. The apparatus for supplying energy to a load as set forth in claim 31, wherein said two-part induction connector is factory wound and supplied complete to meet specific loading requirements.

33. The apparatus for supplying energy to a load as set forth in claim 31, wherein said two-part induction is a user wound primary and secondary inductive connector has a preformed profile, to ensure that a correct number of windings are applied.

34. The apparatus for supplying energy to a load as set forth in claim 1 further comprising a lamp having formed in a housing of said secondary core of said two-part induction connector, said lamp being in electrical connection with a winding on said secondary core in order to energize said lamp.

35. The apparatus for supplying energy to a load as set forth in claim 34, wherein said housing having at least a first and second pole pieces of said secondary core.

36. The apparatus for supplying energy to a load as set forth in claim 1, wherein said load is selected from the group of consisting of computers, computer peripheral devices, telecommunications equipment including handheld devices, office equipment, medical equipment, domestic electrical appliances, dish washers, washing machines, micro-wave ovens, food mixers, radios, televisions, hi-fi equipment, audio equipment, mining equipment, industrial equipment, aerospace equipment, marine and sub-marine equipment, automotive equipment, commercial and domestic furniture, school equipment, retail point of sale and advertising equipment, road signs, road markings, street furniture, petrochemical equipment, lighting, transport airfield and runway, road signs, road markings, electronic surveillance equipment, printed circuit boards, military equipment, transport equipment and security systems.

37. An apparatus for supplying energy to a load, comprising:
   a power supply unit having an input for receiving current at mains frequency, means for increasing said frequency to a higher frequency, and an output for delivering energy at said higher frequency;
   a socket having a first core portion that has a primary winding connection connected to said output of said power supply unit, said first core portion being of a high resistivity material;
   a plug connectable to said socket, said plug having a second core portion within a housing, said second core portion has a secondary winding connection for delivering energy to a load, said second core portion being of a high resistivity material; and
   wherein said housing having a fastening means for use with said load.

38. The apparatus for supplying energy to a load as set forth in claim 37, wherein said fastening means is selected from the group consisting of bayonet formations, a screw formation, clips, catches, and a slidable engagement mechanism.

39. The apparatus for supplying energy to a load as set forth in claim 37, wherein said power supply unit being adapted for use with renewable electricity generators selected from the group consisting of wind, solar, wave, and hydroelectric generators.

40. An apparatus for supplying energy to a load, comprising:
   a power supply unit having an input for receiving current at mains frequency, means for increasing said frequency to a higher frequency, an output for delivering energy at said higher frequency, and a primary core and winding of an inductive coupler;
   at least one load having a secondary core and winding of an inductive coupler; and
   a coupler for removably connecting said power supply unit and said load, said coupler functioning as a transformer;
   wherein said primary and secondary cores are made of a ferrite that avoids eddy currents and low hysteresis loss.

41. The apparatus for supplying energy to a load as set forth in claim 40, wherein said primary and secondary cores are made of a metallic oxide-based ceramic that avoids eddy currents and low hysteresis loss.

\* \* \* \* \*